United States Patent
Ziska et al.

(10) Patent No.: US 8,222,989 B2
(45) Date of Patent: Jul. 17, 2012

(54) METHOD FOR THE PROTECTION OF A MOVABLE OBJECT, ESPECIALLY A VEHICLE, AGAINST UNAUTHORIZED USE

(75) Inventors: Andreas Ziska, Berlin (DE); Gunda Müffelmann, Schöneiche (DE); Joachim Küter, Berlin (DE); Shirley Bortfeldt-Herkendell, Berlin (DE)

(73) Assignee: Bundesdruckerei GmbH, Berlin (DE)

( * ) Notice: Subject to any disclaimer, the term of this patent is extended or adjusted under 35 U.S.C. 154(b) by 888 days.

(21) Appl. No.: 12/293,858

(22) PCT Filed: Mar. 15, 2007

(86) PCT No.: PCT/EP2007/052459
§ 371 (c)(1),
(2), (4) Date: Dec. 10, 2008

(87) PCT Pub. No.: WO2007/113093
PCT Pub. Date: Oct. 11, 2007

(65) Prior Publication Data
US 2009/0207004 A1    Aug. 20, 2009

(30) Foreign Application Priority Data
Mar. 30, 2006  (DE) .......................... 10 2006 015 212

(51) Int. Cl.
*G06F 7/04* (2006.01)
(52) U.S. Cl. ....................................................... 340/5.1
(58) Field of Classification Search .................. 340/5.2, 340/5.6, 5.8, 5.1; 726/5, 23; 705/31; 713/175, 713/193; 380/45
See application file for complete search history.

(56) References Cited

U.S. PATENT DOCUMENTS 5,144,667 A *  9/1992  Pogue et al. .................... 380/45
5,711,392 A    1/1998  Buedel
(Continued)

FOREIGN PATENT DOCUMENTS

CN    1522903 A    8/2004
(Continued)

OTHER PUBLICATIONS

International Search Report for corresponding application PCT/EP2007/052459, Aug. 13, 2007.
International Preliminary Report on Patentability for corresponding application PCT/EP2007/052459, Jun. 30, 2008.
Written Opinion for corresponding application PCT/EP2007/052459, Sep. 30, 2008.
Relevant portions of: D1=CN1522903A (corresponding U.S. 7,161,464) D2= U.S. 5,880,679, Oct. 1, 2010.
Partial Translation of First Office Action for corresponding Chinese Application No. 200780011786.5, Oct. 1, 2010.

*Primary Examiner* — Jennifer Mehmood
*Assistant Examiner* — Kaleria Knox
(74) *Attorney, Agent, or Firm* — Matthew B. Dernier, Esq.; Gibson & Dernier LLP

(57) ABSTRACT

The invention relates to a method for protection of a movable asset, particularly a motorvehicle (100), against unauthorized use with the following steps: cryptographic identity verification and/or cryptographic authentication of the vehicle with an external computer system (108), verification whether a blocking is stored for the motorvehicle, transmission of a signal from the computer system to the vehicle in order to allow use of the motorvehicle if no blocking is stored for the motorvehicle.

8 Claims, 10 Drawing Sheets

U.S. PATENT DOCUMENTS

Figure 1:
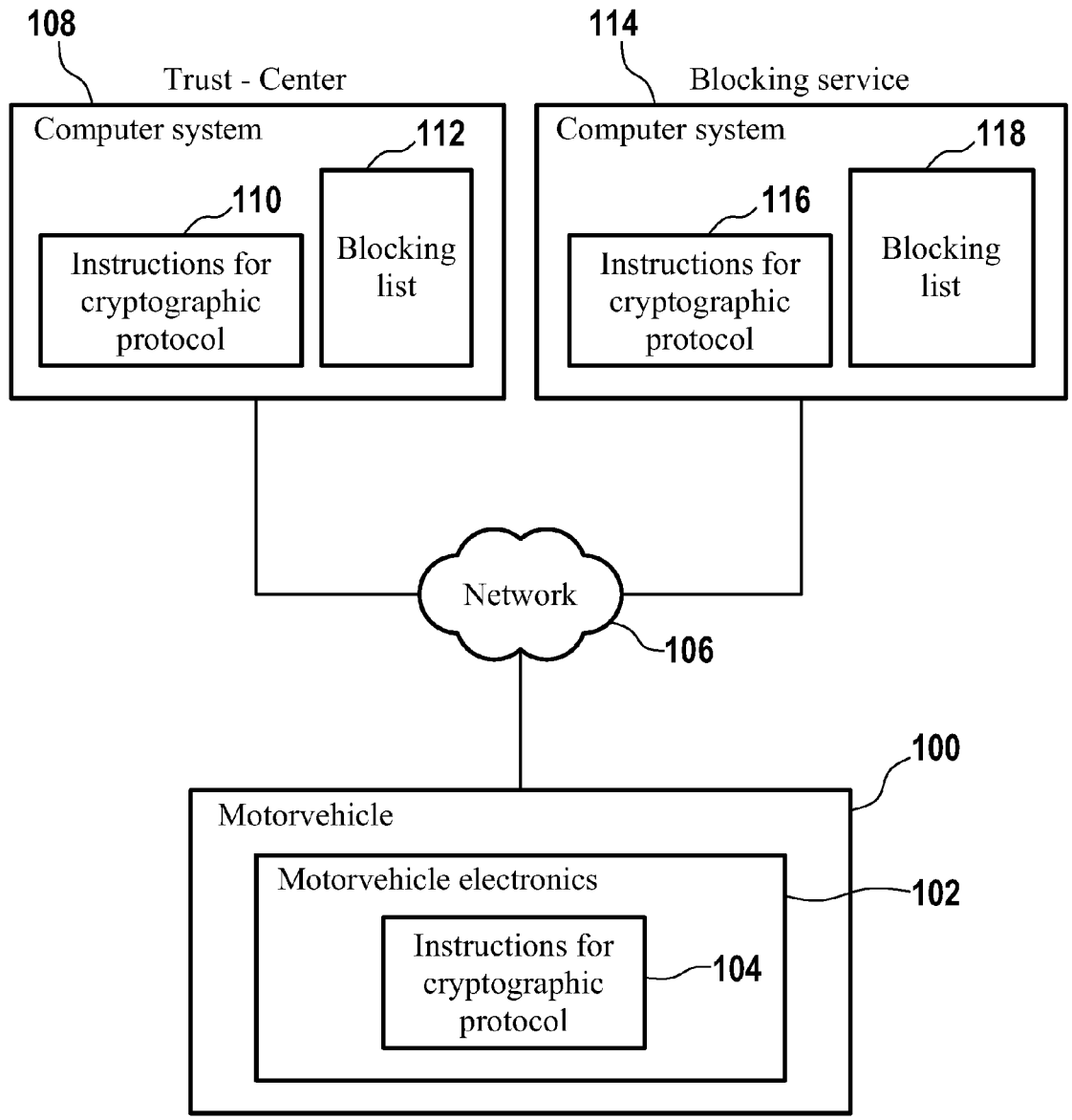

| | | | | |
|---|---|---|---|---|
| 5,880,679 A * | 3/1999 | Lenart et al. | | 340/5.6 |
| 6,170,058 B1 * | 1/2001 | Kausik | | 713/193 |
| 6,983,381 B2 * | 1/2006 | Jerdonek | | 726/5 |
| 7,161,464 B2 * | 1/2007 | Yuhara | | 340/5.2 |
| 7,448,083 B2 * | 11/2008 | Kashiwada | | 726/23 |
| 7,770,012 B2 * | 8/2010 | Gupta | | 713/175 |
| 7,868,736 B2 * | 1/2011 | Fukushima et al. | | 340/5.8 |
| 7,908,190 B2 * | 3/2011 | Enenkiel | | 705/31 |
| 2002/0095507 A1 | 7/2002 | Jerdonek | | |
| 2002/0135466 A1 | 9/2002 | Bunyan | | |
| 2004/0145447 A1 | 7/2004 | Yuhara | | |

FOREIGN PATENT DOCUMENTS

| | | |
|---|---|---|
| DE | 4440975 C2 | 5/1996 |
| DE | 19508369 C1 | 7/1996 |
| EP | 1281588 A | 5/2003 |
| EP | 1439100 A2 | 7/2004 |

* cited by examiner

METHOD FOR THE PROTECTION OF A MOVABLE OBJECT, ESPECIALLY A VEHICLE, AGAINST UNAUTHORIZED USE

The invention relates to a method for the protection of a movable asset against unauthorized use and the corresponding computer program products and computer systems and a motorvehicle electronics device.

From US 2002/0135466 A1, the authentication of a PDA, which can be coupled with a motorvehicle, with a server computer is known. In this case, the PDA fulfills the function of a key for starting the vehicle. The disadvantage is that, in case of a theft of the PDA, the thief can also use the vehicle. In addition, the motorvehicle electronics can be manipulated in order to change the identity of the vehicle.

From DE 4440975 C2, a third party usage protection device for a vehicle is known. This device is designed to transmit usage signals periodically and sequentially to each other from a vehicle external site via a transmission line based on electromagnetic waves and to keep one or more vehicle aggregates required for vehicle operation in operational state by the usage control device, from a usage signal on received by the latter for a defined time period, which is longer than the time difference between two consecutive usage signals, while their further operation and consequently that of the motorvehicle is blocked totally if during this defined time period no additional usage signal is received. For the usage of the motorvehicle, therefore, the reception of authorizing signals is required.

Upon theft, the authorized person announces it to the site, authorized for the transmission of the usage signals, which consequently stops the transmittal of usage signals, which then causes the usage control device to block further operation of the vehicle. This can occur either immediately after the absence of a usage signal or after expiration of an additional time interval. If, for example, no additional usage signal is received within an authorized aggregate operation period, the corresponding vehicle aggregates will be kept operational by the usage control device for a predefined time interval so that no safety-critical vehicle states or availability problems result. Upon the expiration of the time interval, the corresponding vehicle aggregates are then brought to their operation blocked state by the usage control device after the next time turning off the ignition so that the vehicle cannot be brought back into operational state.

The transmission of the usage signals through the radio network is assumed to be largely resistant against manipulation through the fact that it should not be possible, neither for the authorized person nor particularly for an unauthorized person, to detect from the multitude of radiated usage signals for different vehicles the one that is destined for the pertinent vehicle in order to be able to generate it elsewhere for the purpose of circumventing the system. If desired, a code based usage signal transmission can be installed, as is commonly the case, for instance, for the usage code transmission in access authorization systems with electronic key coding.

Such code-based usage signal transmission, during which the vehicle is identified through a code attributed to the motorvehicle, can be, however, detected and circumvented by manipulation of, e.g., the motorvehicle electronics.

The invention, on the other hand, is based on the task of creating an improved method for protection of a movable asset, particularly of a vehicle, against unauthorized use, as well as the corresponding computer program products and computer systems and, additionally, an improved electronic device for the protection of a movable asset against unauthorized use.

The tasks that are the basis for the invention are each solved with the features of the Claims. Preferred embodiments of the invention are indicated in the dependent Claims.

According to the invention, a method for the protection of a movable asset against unauthorized use is created with the following steps: cryptographic identity verification and/or cryptographic authentication of the movable asset with an external computer system, verification regarding whether blocking is stored for the movable asset, transmission of a signal from the computer system to the movable asset in order to allow the use of the movable asset if no blocking exists for the movable asset.

According to the invention, movable assets are to be understood as movable capital assets, such as aircraft, vehicles, particularly motorvehicles, construction machines, movable facilities, portable computers, particularly laptop computers, mobile telephones, Smart Phones, etc., and, particularly, those movable capital assets that include one or more electronic components.

Contrary to the state of the art, a cryptographic identity verification and/or cryptographic authentication of the movable asset itself, e.g., the motorvehicle, is done in accordance with the invention with the external computer system. This ensures that a usage signal or a blocking signal sent by the computer system reaches the right motorvehicle and not a stolen motorvehicle whose identity has been changed by manipulation of the motorvehicle electronics.

Under "authentication," the proof of the identity of the motorvehicle is hereby understood. This is proven by means of a cryptographic method that is based, for instance, on an asymmetric pair of keys attributed to the vehicle or its motorvehicle electronics, as well as the corresponding certificate. The certificate contains an identifier that identifies the motorvehicle and/or its motorvehicle electronics.

Under "identity verification," the verification of the already known identity of the motorvehicle and/or its motorvehicle electronics is hereby understood. The authentication can, therefore, for instance, also be made without a cryptographic method if, afterwards, a verification of the identity, i.e., the identity verification, is done by means of a cryptographic method or vice versa. Identity verification can also be based on an asymmetric pair of keys and a corresponding certificate attributed to a motorvehicle or its motorvehicle electronics.

According to an embodiment of the invention, cryptographic identity verification and/or cryptographic authentication is done, therefore, by using an asymmetric pair of keys that is attributed to the motorvehicle.

For the execution of the cryptographic identity verification and/or cryptographic authentication, a computer system generates, for instance, a random number, particularly a pseudo random number. The pseudo random number is transmitted by the computer system without encryption to the movable asset, e.g., to the motorvehicle. The pseudo random number is encrypted by the motorvehicle electronics by means of a secret key that is attributed to the motorvehicle. The encrypted pseudo random number is sent back by the motorvehicle to the computer system together with the certificate of the motorvehicle.

The computer system then deciphers the pseudo random number, which was received in an encrypted manner, by means of the public key of the received certificate. If both pseudo random numbers coincide, that means that the asymmetric pair of keys attributed to the motorvehicle, consisting of the secret and the public key, and the corresponding certificate, are valid. Through the certificate attributed to the asymmetric pair of keys, therefore, the identity of the motorvehicle is unambiguously confirmed.

According to an embodiment of the invention, the external computer system has a database for the storage of blocking. If, for instance, a motorvehicle is announced as stolen, a corresponding blocking is entered into the database. After execution of the cryptographic authentication, the computer system accesses the database in order to determine whether the motorvehicle, for which the cryptographic identity verification and/or cryptographic authentication has been done, is entered into the database as blocked. If this is the case, the computer system transmits a corresponding blocking signal to the motorvehicle so that it cannot be started, for instance, after switching off the ignition.

According to an embodiment of the invention, the computer system receives a signed code from the motorvehicle. The computer system verifies the sign code for validity. Only if the signed code is valid and, additionally, no blocking of the motorvehicle is stored in the database, does the computer system transmit the usage signal to the motorvehicle in order to allow the use of the motorvehicle.

The code can be, for instance, a serial number, type number, manufacturer number, and/or a chain of such numbers, or a code generated by another algorithm from one or several of such numbers. As an example, serial numbers of one or several of the components of the motorvehicle electronics enter into the generation of the code. The code is generated, for instance, by sequencing of serial numbers. Alternately or additionally, a hash value is formed out of a serial number or sequenced serial, type, and/or manufacturer numbers, which then serves as code.

The code thus generated is signed by the motorvehicle electronics and transmitted to the external computer system where the signed code is verified for validity. If, during a manipulation attempt of the motorvehicle electronics, one component of the motorvehicle electronics, which contributes, for instance, by its serial number for the generation of the code, is exchanged, then this leads to a changed code and, consequently, to an invalidity of the signed code that is received by the external computer system. If the external computer system determines the invalidity of the code, this leads to the transmission of the blocking signal.

According to an embodiment of the invention, both the usage signal and the blocking signal are signed with a secret key of the computer system. The signature is verified in both cases by the motorvehicle electronics before the usage signal or the blocking signal can become effective. This ensures that usage signals or blocking signals cannot be transmitted by a site that is not authorized for the transmission.

According to an embodiment of the invention, the certificate for the pair of keys attributed to the motorvehicle electronics is replaced by an auxiliary certificate if, for instance, a component of the motorvehicle electronics must be exchanged for repair. In such case, the code could change by the exchange of the component. The request for the auxiliary certificate is preferably reserved for authorized garages.

According to an embodiment of the invention, the external computer system belongs to a Trust-Center of a so-called Public Key Infrastructure (PKI).

In a further aspect, the invention relates to a computer program product for the execution of a method according to the invention, for instance, on the computer system of a Trust-Center.

In a further aspect, the invention relates to a computer system with means for cryptographic identity verification and/or cryptographic authentication of a vehicle, means for determination of a usage status of the vehicle, and means for transmission of a signal to the vehicle as a function of the usage status.

In a further aspect, the invention relates to a method for the protection of the motorvehicle that is performed by the motorvehicle electronics. The method contains the following steps: cryptographic identity verification and/or cryptographic authentication of the motorvehicle with an external computer system and reception of a usage signal or a blocking signal from the computer system.

According to an embodiment of the invention, a code attributed to the vehicle is signed by the motorvehicle electronics, and the signed code is transmitted to the external computer system so that the signed code can be verified there for validity. The code attributed to a motorvehicle can be generated, for instance, from one or several identifiers of components of the motorvehicle electronics, such as serial, type, and/or manufacturer identifiers that are stored in the components of the motorvehicle electronics. The code attributed to a motorvehicle is, therefore, a characteristic of this motorvehicle that is defined by the actual composition of its components and can be regarded, therefore, as a "fingerprint," so to speak, of the motorvehicle.

According to an embodiment of the invention, a position signal is generated that defines the actual geographic position of the motorvehicle after a blocking signal has been received. This facilitates the finding of the motorvehicle that has been announced as stolen.

In a further aspect, the invention relates to a computer program product with an instruction for the execution of a method, in accordance with the invention, to be performed by the motorvehicle electronics.

In a further aspect, the invention relates to a motorvehicle electronics device, such as an Electronic Control Unit (ECU), with means for cryptographic identity verification and/or cryptographic authentication of the motorvehicle with a computer system and means for reception of a usage signal or a blocking signal from the computer system.

For the generation of the code characteristic for the motorvehicle, the individual components of the motorvehicle electronics can be formed for a cryptographic identity verification and/or cryptographic authentication with a control device and/or with each other in order to prevent manipulation.

Figure 2:
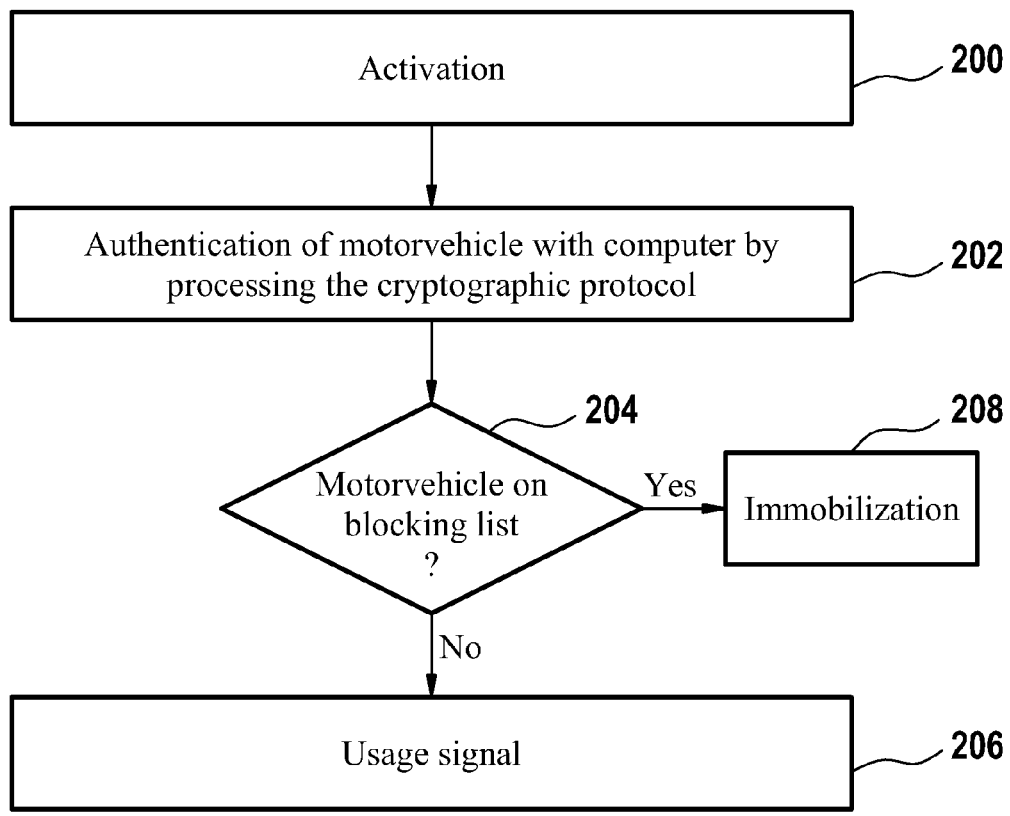
Figure 3:
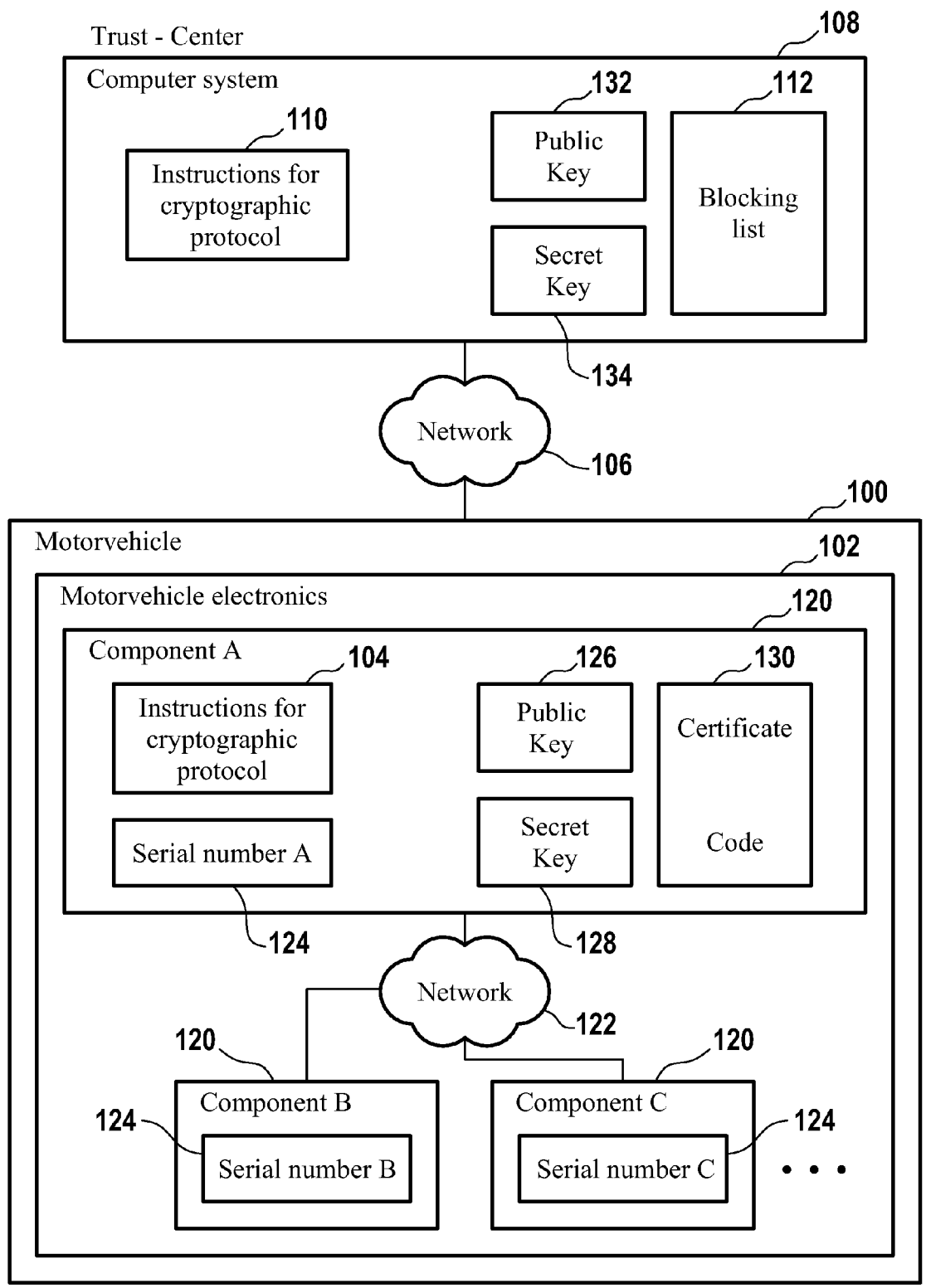
Figure 4:
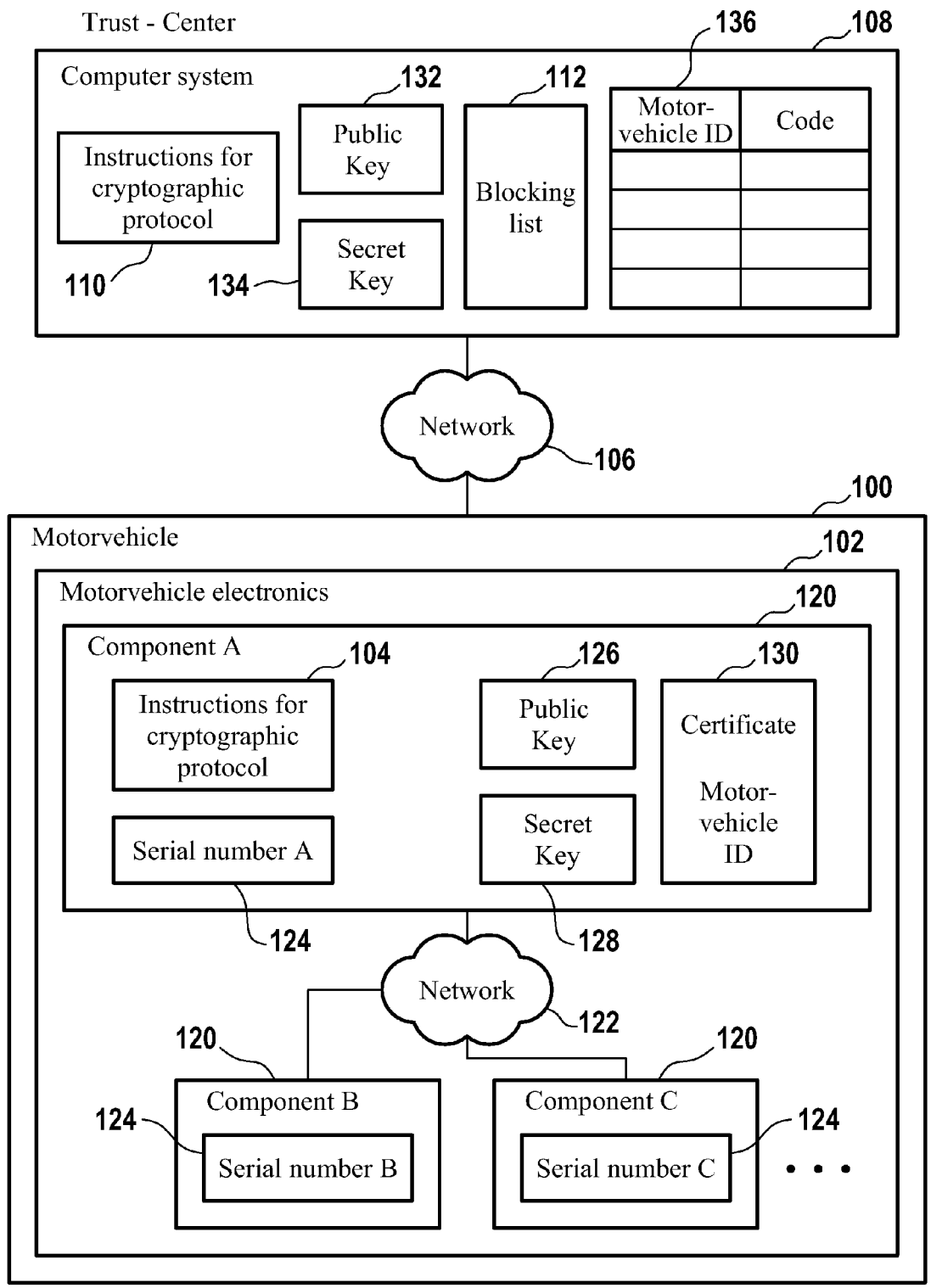
Figure 5:
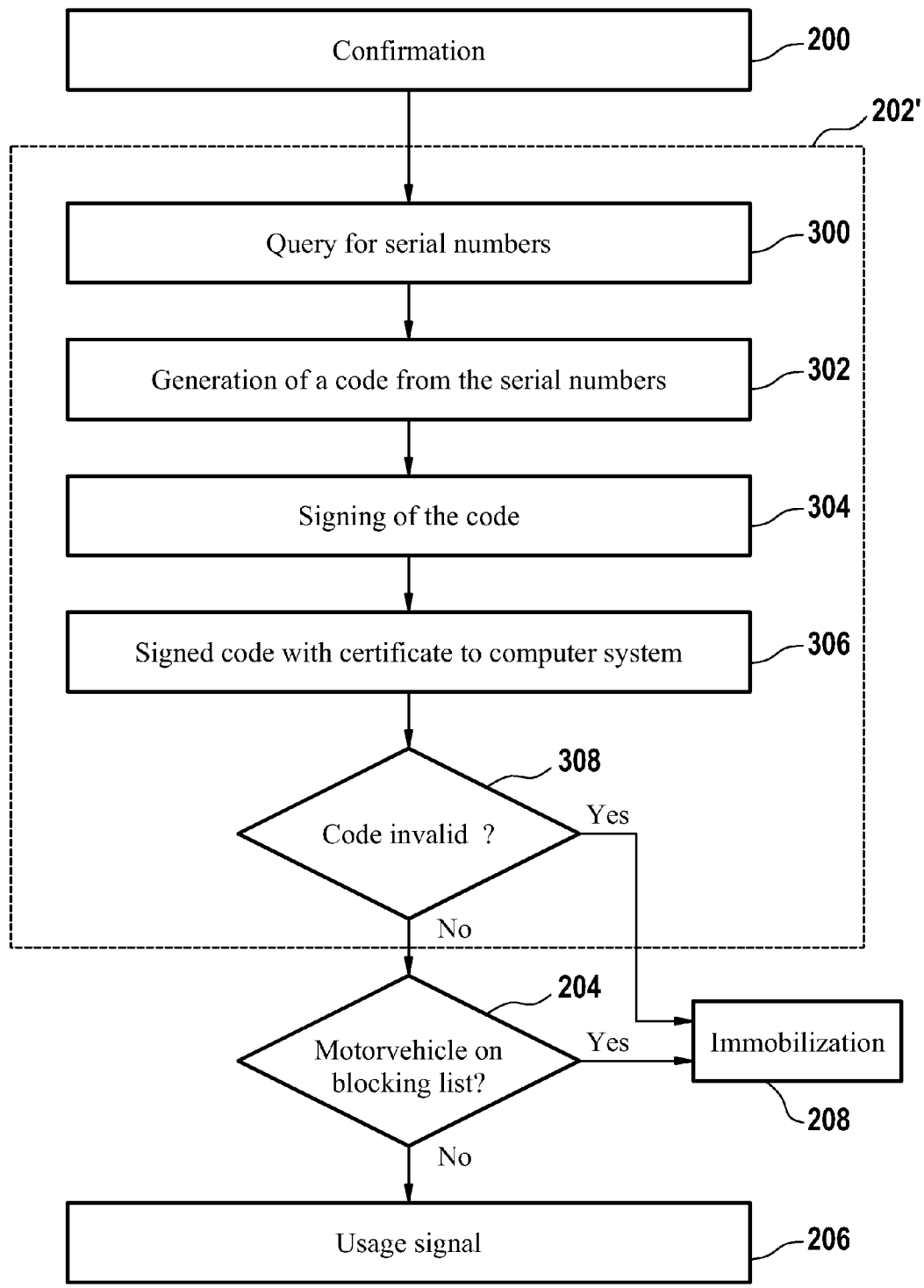
Figure 6:
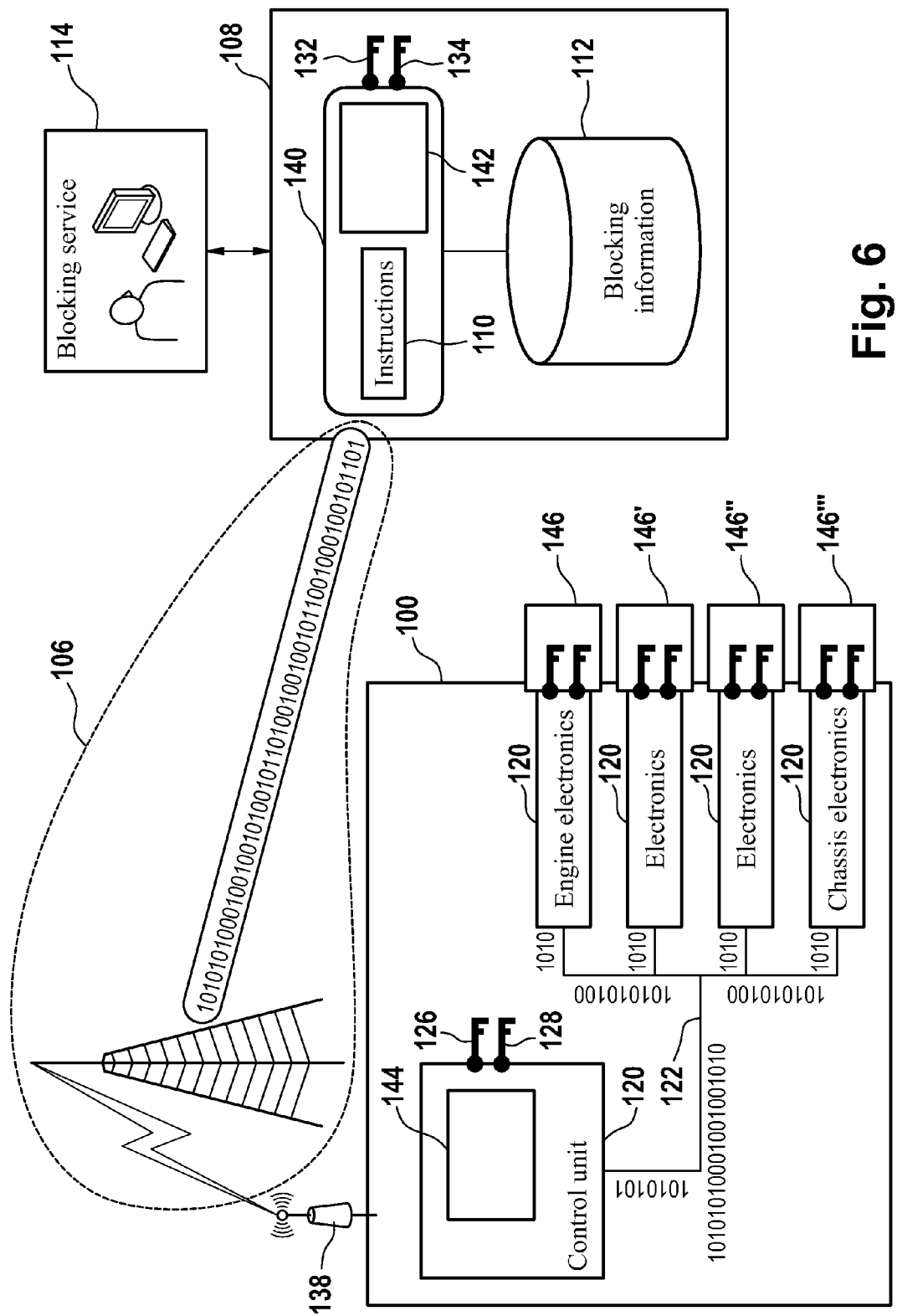
Figure 7:
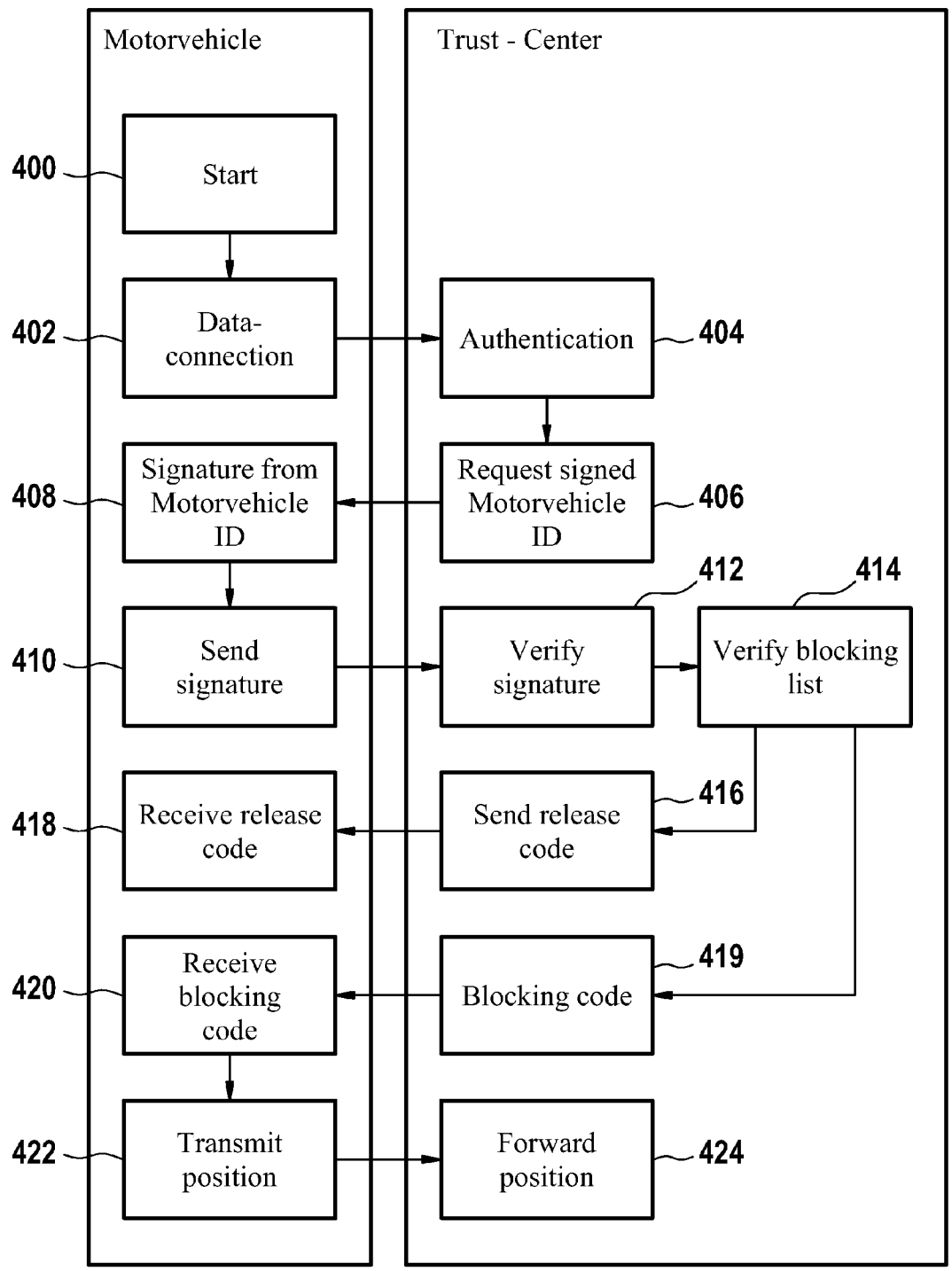
Figure 8:
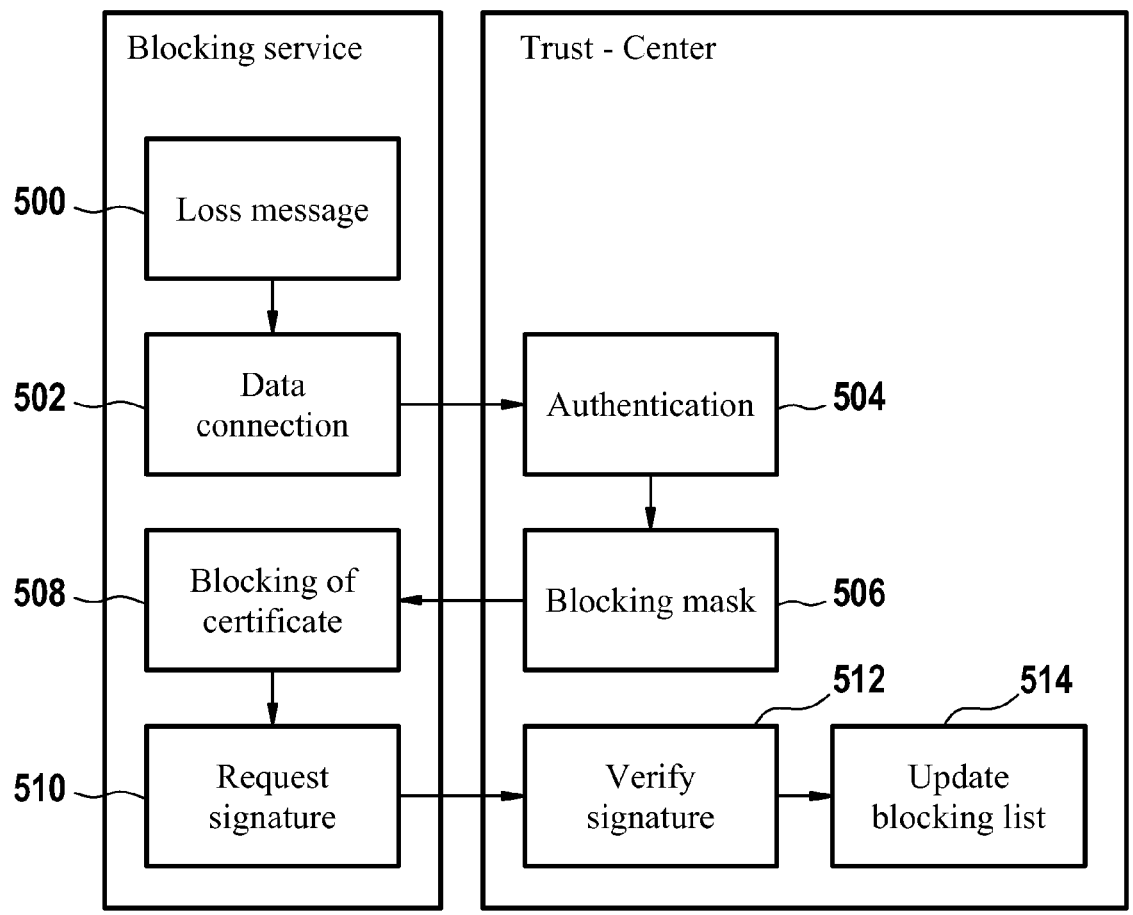
Figure 9:
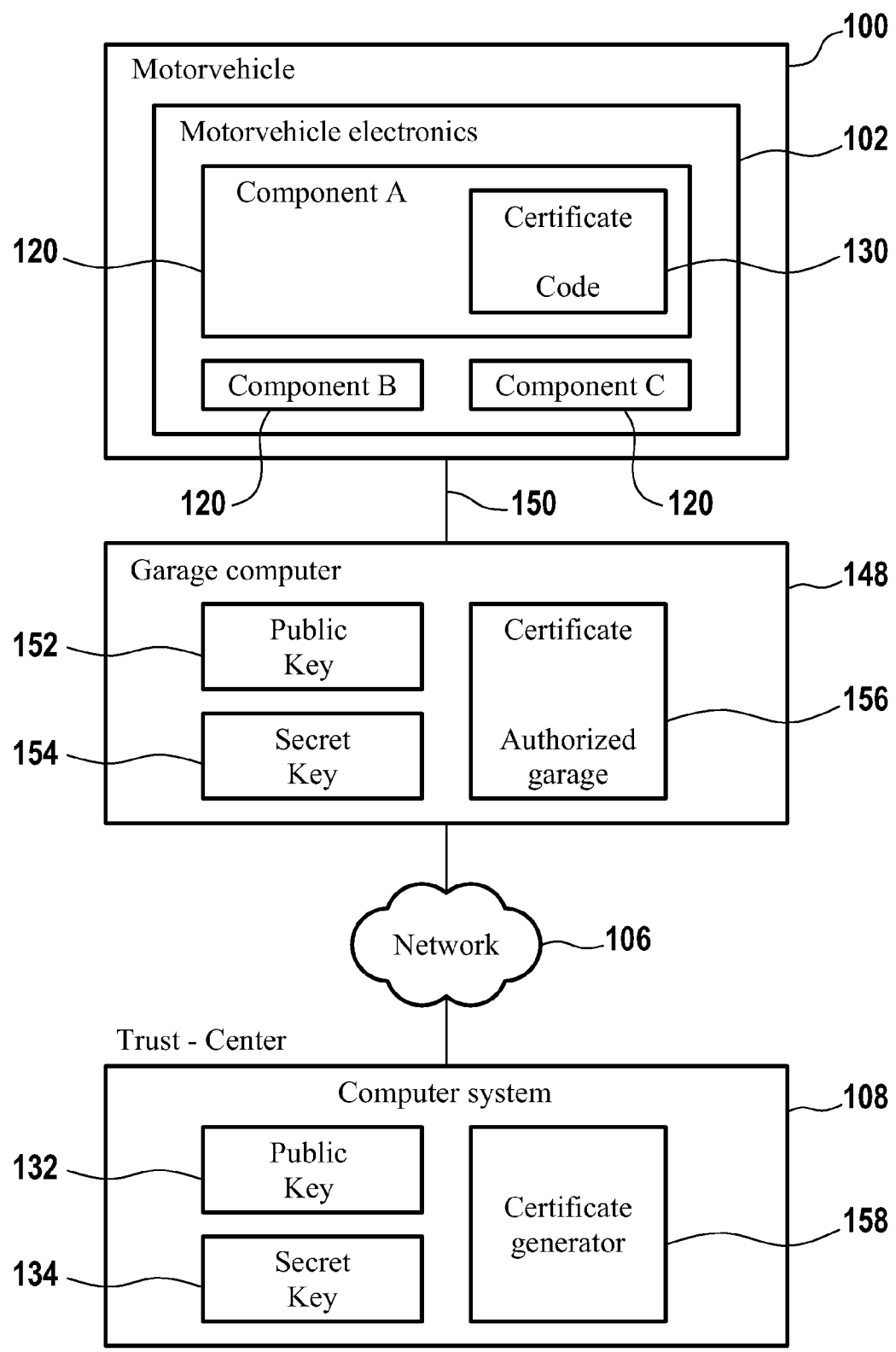
Figure 10:
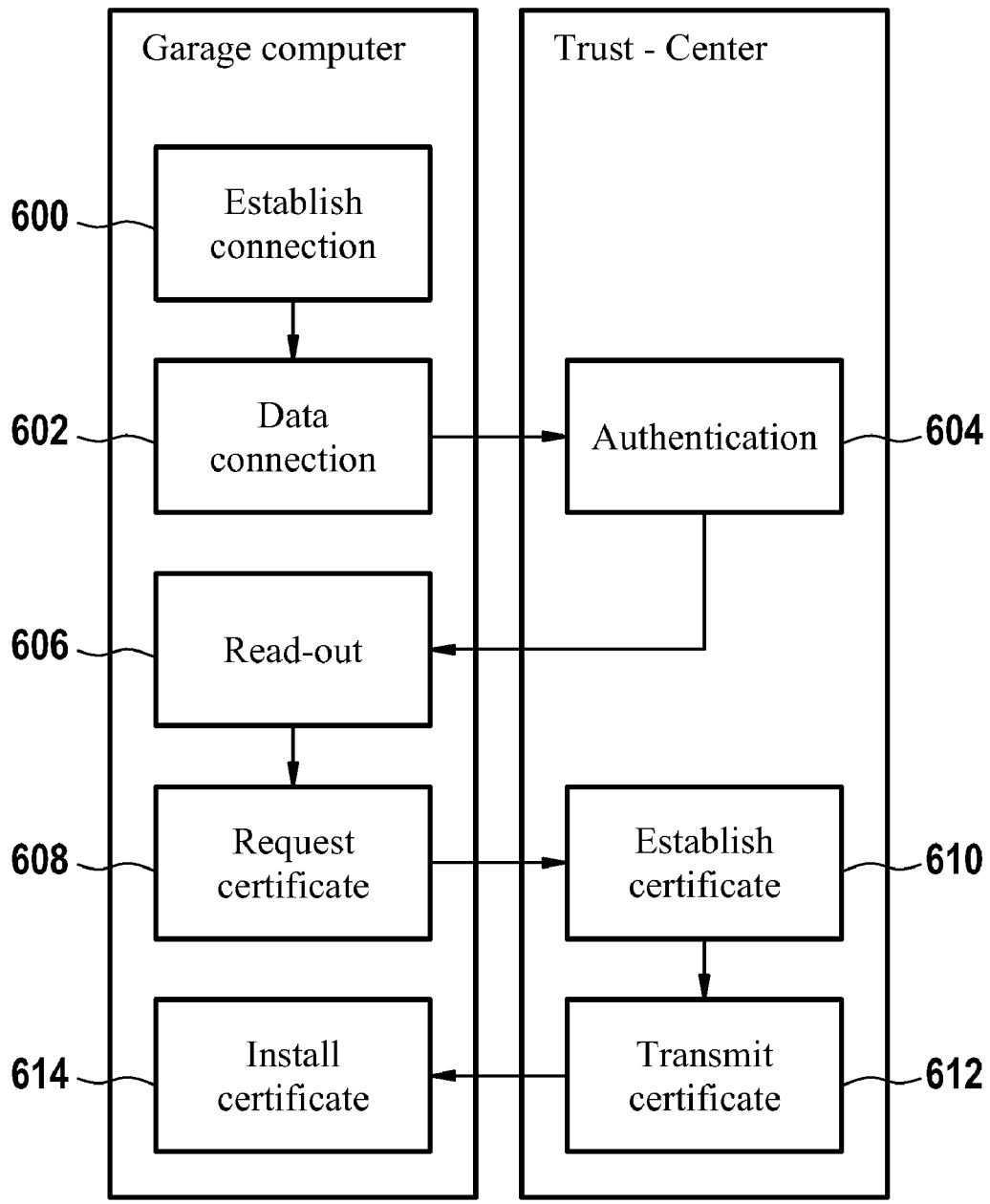

In the following, examples for the embodiment of the invention are described in more detail with reference to the drawings. Shown are:

FIG. 1 a block diagram of an embodiment of the computer system according to the invention and a motorvehicle electronics according to the invention, FIG. 2 a flow diagram of an embodiment of a method according to the invention, FIG. 3 a block diagram of a further embodiment of a computer system according to the invention and a motorvehicle electronics according to the invention, FIG. 4 a block diagram of a further embodiment of a computer system according to the invention and a motorvehicle electronics according to the invention, FIG. 5 a flow diagram of an embodiment of a method according to the invention, FIG. 6 a block diagram of a further embodiment of a computer system of a Trust-Center and a blocking service, according to the invention, and a motorvehicle electronics according to the invention, FIG. 7 a flow diagram of a further embodiment of a method according to the invention, FIG. 8 a flow diagram of a further embodiment of a method according to the invention, FIG. 9 a block diagram of an embodiment of a computer system for a Trust-Center, according to the invention, a garage computer according to the invention, and a motorvehicle electronics according to the invention, FIG. 10 a flow diagram of a further embodiment of a method according to the invention.

Elements of the following embodiments, which correspond to each other, are designated with the same reference marking.

FIG. 1 schematically shows a motorvehicle 100 that can be, for instance, a passenger car or a commercial vehicle. The motorvehicle 100 is particularly a high-priced motorvehicle that shall be protected especially against theft.

The motorvehicle 100 contains motorvehicle electronics 102, which can include one or more motorvehicle electronics devices. The motorvehicle electronics devices can be, for instance, so-called Electronic Control Units (ECUs) that can, for instance, communicate with each other via a CAN and/or LIN Bus.

Instructions 104 can be executed by the motorvehicle electronics 102 in order to implement a cryptographic protocol. Alternately or additionally, the motorvehicle electronics 102 can contain a chip card reader, for instance, for a chip card in the Subscriber Identity Module (SIM) format, which contains a micromethod or for the execution of the instructions 104.

The motorvehicle 100 can be connected with a computer system 108 via a network 106. Network 106 can be a public communication network, for instance, a cellular radio network and/or a computer network, particularly the internet. The communication between the motorvehicle electronics 102 and the computer system 108 can be implemented through a cellular radio connection, such as GSM, UMTS, or CDMA, or with the help of another radio connection, for instance, via analog FM or as part of TMC. Additionally, different messaging channels can be used for the uplink, i.e., from the motorvehicle electronics 102 to the computer system 108, and for the downlink, i.e., for the communication connection from the computer system 108 to the motorvehicle electronics 102. This applies analogously for the communication between the computer systems 108 and 114.

The computer system 108 is preferably located in a high-security environment, for instance, in a so-called Trust-Center. The computer system 108 serves for the execution of instructions 110 of a computer program for the implementation of the cryptographic protocol.

By means of the cryptographic protocol, the identity of the motorvehicle 100 is determined and/or verified. The motorvehicle 100 is unambiguously identified, for example, by a motorvehicle specific code or another identifier such as, for example, the official registration identification of the motorvehicle. Such a motorvehicle identifying code or such identifier or vehicle ID will be designated in the following as Motorvehicle Identifier (Motorvehicle ID).

With the Motorvehicle ID as key, the computer system 108 can access storage unit 112, in which the Motorvehicle IDs of blocked motorvehicles are stored for which a loss message has been made. A corresponding blocking list of blocked motorvehicles can be stored in the storage unit 112 in the form of a database.

The entry of a blocking into the storage unit 112 can be made directly through the computer system 108. However, is also possible that such blocking can be entered from another computer system 114 that can exchange data with the computer system 108 via the network 106 or via another communication connection.

In the embodiment in discussion here, the computer system 114 also serves for the execution of instructions 116 of a computer program for the implementation of a cryptographic protocol. By means of the cryptographic protocol, the identity of the computer system 114 and its authorization for entering a blocking of a motorvehicle into the storage unit 112 is determined and/or verified. In addition, the computer system 114 has an application program 118 that serves for the recording of loss messages of motorvehicles.

If the use of the motorvehicle 100 is carried out by an authorized user, no blocking is stored in the storage unit 112 for the motorvehicle 100. Upon the starting of the motorvehicle 100, the execution of the instructions 104 is started, for instance, by the motorvehicle electronics 102 or by the chip card. The motorvehicle electronics 102 establish a connection with the computer system 108 through the network 106 so that the execution of instructions 110 is started there. By the execution of the instructions 104 by the motorvehicle electronics 102, and by execution of the instructions 110 by the computer system 108, a cryptographic protocol is realized based on which, for instance, the authenticity of the Motorvehicle ID of the motorvehicle is verified. The communication between the motorvehicle electronics 102 and the computer system 108 via the network 106 is done, for instance, according to a so-called Request-Response Protocol, e.g., http or https.

After the identity of the motorvehicle 100 is verified and/or authenticated by the methoding of the cryptographic protocol, the computer system 108 verifies whether a blocking of the motorvehicle 100 is stored in the storage unit 112. Since this is not the case here, the computer system 108 then transmits a usage signal that is transmitted via the network 106 to the motorvehicle 100. Only based on receipt of the usage signal can the use of the motorvehicle 100 be implemented. The engine of the motorvehicle 100 can only, for instance, be started or the immobilizer system deactivated after receipt of the usage signal, or the manual brake and/or the brakes of the motorvehicle 100 can only be released after receipt of the usage signal.

The usage signal can have a certain validity period so that this method is repeated each time during the operation of the motorvehicle 100 before expiration of the validity period.

If the motorvehicle 100 has been stolen, the owner of the motorvehicle 100 can contact a blocking service that operates the computer system 114. Such blocking service can be made available by, for instance, a service company, an official agency, or the police.

If the owner announces the loss of his motorvehicle 100, this is registered by means of application program 118. The computer system 114 establishes a connection with the computer system 108 and a cryptographic identity verification and/or cryptographic authentication of the computer system 114 is done with the computer system 108 in order to ensure that a blocking request is recorded only by a computer system authorized for this purpose. After successful cryptographic identity verification and/or cryptographic authentication of the system 114 with the computer system 108, the blocking request is transmitted, for instance, with the motorvehicle ID from the computer system 114 via the network 106 to the computer system 108 to be stored in the storage unit 112.

If, after the theft of the motorvehicle 100 and after the blocking has been stored in the storage unit 112, the ignition of the motorvehicle 100 is activated, then the execution of the instructions 104 is started again by the motorvehicle electronics 102. After identity verification and/or authentication of the motorvehicle 100 with the computer system 108, the latter, in fact, determines that a blocking for the motorvehicle 100 has been filed in the storage unit 112. The computer system 108, therefore, does not transmit a usage signal to the motorvehicle 100 so that it cannot be used. On the other hand, the computer system 108 can transmit, in this case, a blocking signal to the motorvehicle 100 in order to immobilize it.

If a manipulation attempt has been undertaken on the motorvehicle electronics 102 in order to circumvent this safety mechanism by exchanging one or more of the components of the motorvehicle electronics 102, then this leads to a change of the motorvehicle ID so that the cryptographic identity verification and/or cryptographic authentication surely fails. In this case, too, no usage signal is transmitted.

The cryptographic protocol implemented by the instructions 104 and 110 or 116 and 110 can proceed, for instance, as follows:

The motorvehicle electronics 102 transmit a request to the computer system 108. The computer system 108 then generates a random number, particularly a pseudo random number. The random number is transmitted back by the computer system 108 via the network 106 to the motorvehicle 100. The motorvehicle electronics 102 encode the received random number by means of a secret key that is, for instance, stored on the chip card so that the motorvehicle electronics receives an enciphered number.

This enciphered number, as well as the certificate of the motorvehicle electronics 102, are transmitted back by the motorvehicle electronics 102 to the computer system 108 as the response. The computer system deciphers the enciphered number by means of the public key of the certificate. If the random number generated by the computer system 108 coincides with the random number received as the response from the motorvehicle electronics 102, then the identity verification and/or authentication of the motorvehicle 100 is successfully completed.

As an example, the motorvehicle electronics 102 transmit to the computer system 108, together with the initial request for the start of the cryptographic protocol, the certificate belonging to its pair of keys. The certificate can include the motorvehicle ID of the motorvehicle 100 so that the computer system 108 receives, in this way, in the form of the motorvehicle ID, an access key for the access to the storage 112 in order to verify whether a blocking is stored relative to this vehicle.

According to the same principle, also, the cryptographic identity verification and/or cryptographic authentication of the computer system 114 with the computer system 108 can proceed. The computer system 114 also receives, from the computer system 108, a random number encoded with the public key of the computer system 114, which the computer system 114 decodes with its secret key and then transmits back the random number to the computer system 108. If the random number encoded by the computer system 108 coincides with the random number received back as a response from the computer system 114, then, again, the cryptographic identity verification and/or cryptographic authentication are successfully completed.

The different computer systems 114, each of which can communicate with the computer system 108 via the network 106, can exist decentrally distributed for the recording of loss messages. As an example, such computer systems 114 can be located at police stations, authorized car dealers or garages, and/or in call centers at which the loss of the motorvehicle can be announced by telephone or by other means such as email.

This creates an effective protection of motorvehicles against unauthorized use, which makes theft unattractive. Since, according to the invention, no safety equipment is to be influenced directly by the driver exists, such as biometric safety devices or alarms, the threat potential for the authorized user of the motorvehicle is, additionally, reduced.

FIG. 2 shows a corresponding flow diagram. In step 200, the activation of an operating element of the motorvehicle is done such as, for instance, the activation of the central locking, in order to open the motorvehicle, the operation of the starter of the motorvehicle to start the engine, or the operation of the manual or foot brake in order to release them.

Through such activity in the step 200, the subsequent method for the cryptographic identity verification and/or cryptographic authentication for the reception of a usage or blocking signal is started. If the sequence is started already, for instance, by activation of a remote control for opening the motorvehicle, this has the advantage that the method is already running while the driver approaches the motorvehicle and enters it and, possibly, can already be concluded when the driver has reached the motorvehicle so that the driver, after he has entered, can start the operation of the motorvehicle without or with only a slight time delay.

The start of this method can also be done automatically after, for instance, a so-called Keyless-go locking system has been activated. If, therefore, the locking system senses the RFID key card in the proximity of the motorvehicle, the method is started.

In the step 202, the identity verification and/or authentication of the motorvehicle with a computer of the corresponding Trust-Center is done by methoding through a cryptographic protocol (See also the instructions 104 and 110 in FIG. 1).

After successful cryptographic identity verification and/or authentication of the motorvehicle, the Trust-Center then verifies if the motorvehicle is noted on a blocking list. If that is not the case, a motorvehicle-specific usage signal is generated for the motorvehicle and transmitted to the motorvehicle in the step 206.

The usage signal is preferably signed by the Trust-Center. The signature of the usage signal is verified by the motorvehicle electronics with the help of the public key of the Trust-Center. Only if the signature of the usage signal is valid will that be accepted by the motorvehicle electronics in order to allow the use of the motorvehicle. The usage signal preferably also contains the motorvehicle ID of the corresponding motorvehicle.

In the contrary case, i.e., if the motorvehicle is listed on the blocking list, a blocking signal is generated and transferred to the motorvehicle (step 208) This leads to the immobilization of the motorvehicle either immediately or, for instance, at the next start of the motorvehicle.

The motorvehicle electronics can respond to the blocking signal with a message that contains the actual geographic position data of the motorvehicle. This simplifies the finding of the motorvehicle.

FIG. 3 shows an additional embodiment of the computer system 108 of the Trust-Center and of the motorvehicle electronics 102. In the computer system 108, public key 132 and secret key 134 of the Trust-Center 108, for the execution of the cryptographic protocol, as well as for the signing of usage and blocking signals, are stored.

In the embodiment discussed here, the motorvehicle electronics 102 have different components 120 such as, for instance, the components A, B, C . . . , which are connected with each other via a vehicle network 122. The motorvehicle network 122 can be, for instance, a CAN and/or LIN Bus.

An identifier is attributed to each of the components 120, which can be stored in a non-volatile or not easily manipulated storage unit of the corresponding component. Such a code can be, for instance, the corresponding serial number that is stored in such a storage unit 124 of corresponding component 120.

At least one of the components 120 has access to a pair of keys consisting of a public key 126 and a secret code 128, which are attributed to the motorvehicle 100. To the pair of keys 126, 128, belongs a certificate 130.

In the certificate 130, a code is, for instance, stored, which serves for the identification of the motorvehicle 100. This code is generated, for instance, by the execution of the instructions 104, which implement a predefined algorithm in a way that the serial numbers A, B, C, of the different components 120 are queried in order to generate the code based on these serial numbers A, B, C . . . , with the help of the predefined algorithm.

For the execution of the cryptographic protocol, the instructions 104 determine the code by querying the serial numbers A, B, C . . . from the components 120. The code thus generated is signed with the secret key 128 and transmitted to the computer system 108 together with the certificate 130. The computer system 108 verifies the validity of the signed code by means of the public key 126. Only if the signed code is correct, i.e., corresponds to the code stored in the certificate 130, is the cryptographic identity verification and/or authentication successful.

The generation of this code from the serial numbers for the purpose of cryptographic identity verification has the advantage that, upon the exchange of one of the components 120 of the motorvehicle electronics 102, the resulting code necessarily changes. In such case, the code achieved through the querying of the serial numbers and the code stored in the certificate 130 no longer coincide so that the cryptographic identity verification must fail. Through this, the manipulation of the motorvehicle electronics 102 by the exchange of one or several of its components 120 is, therefore, prevented.

The pair of keys 126, 128, and the certificate 130 can be stored on a chip card that also executes at least a part of the instructions 104. In this case, component A has a chip card reader into which the chip card is inserted in order to be able to access the corresponding cryptographic functionalities.

FIG. 4 shows an alternate embodiment for which the certificate does not contain the code gained from the serial numbers but rather another unambiguous motorvehicle ID. Such a motorvehicle ID can be, for instance, the serial number of the motorvehicle itself, the chassis number, the official registration number, or any other unambiguous code.

For the execution of the cryptographic protocol, the motorvehicle electronics, therefore, determines the vehicle-specific code from the different serial numbers of the components 120. This code is signed with the secret key 128 and transmitted to the computer system 108 via the network 106 together with the certificate 130. The computer system 108 accesses attribution table 136 with the Motorvehicle ID as key in order to read out from there the motorvehicle-specific code attributed to the Motorvehicle ID. This code must coincide with the signed code that the computer 108 has received from the motorvehicle electronics 102, together with the certificate 130, so that the cryptographic identity verification and/or authentication can be performed.

FIG. 5 shows a corresponding flow diagram. The cryptographic identity verification and/or authentication of the motorvehicle can be methoded in step 202' of the embodiment of FIG. 5, like in step 202 of the embodiment of FIG. 2. Alternately or additionally, a query of the codes, i.e., the serial numbers, is performed in step 300 by one or more of the components of the motorvehicle electronics by a control device formed for this method. From, for instance, the serial numbers, this control device generates, in step 302, a vehicle-specific code that is signed in step 304 with the help of the secret key of the motorvehicle and transmitted in step 306 to the computer system of the Trust-Center together with the corresponding certificate. It is verified there if this code is invalid (step 308). If this is the case, step 208 is then performed; in the opposite case, step 204 is subsequently done.

The communication between the control device 120 and server 140 is preferably done via a Secure Messaging procedure.

FIG. 6 shows an embodiment of the motorvehicle 100 with a mobile radio antenna 138 that serves for the communication with the computer system 108 via the cellular network 106. The computer system 108 has the server 140 that serves for the execution of the instructions 110.

The pair of keys of the computer system 140 consists of the public key 132 and the secret key 134 and is, in this embodiment, stored on chip card 142, which can access the server 140 through a chip card reading device. The storage unit 112, for storage of the blocking list or blocking information, is, in this embodiment, formed as a separate database that is connected with the server 140.

The component A of the motorvehicle electronics (see FIGS. 3 and 4) is, in this case, formed as a control unit, wherein the asymmetrical pair of keys 126, 128, which is attributed to the motorvehicle 100, is stored on chip card 144, which can be accessed by the control unit 120 through a corresponding chip card reading device.

The additional components 120 of the motorvehicle electronics are, in this case, engine electronic components, two electronic components, as well as chassis electronic components, which can each be formed as separate ECUs. In each of the ECUs, a separate asymmetric pair of keys 146, 146', 146", 146"' are stored.

Before the query of the codes, e.g., the serial numbers, of the components 120, the identity of those must first be cryptographically verified and/or authenticated with the control unit 120 with the help of the corresponding pairs of keys.

For this, it will again be possible to proceed in the manner that control unit 120 generates a pseudo random number, encodes it with the public key of the corresponding pair of keys, for instance, the pair of keys 146, and then transmits it to the corresponding component 120 via the network 122, in the considered example, therefore, to the engine electronic component 120.

The engine electronic component 120 then deciphers the enciphered number received by the control device 120 with the help of the secret key of its pair of keys 146 and transmits the deciphered number back to the control device. Only if the enciphered number, received and deciphered by the engine control electronics, coincides with the originally transmitted random number is the identity of the engine electronics component 120 verified and/or authenticated with the control device 120, at which time the serial number can be queried.

If the cryptographic identity verification and/or authentication of one of the components 120 with the control unit fails, then the latter cannot generate the code and correspondingly transmits a corresponding error message to the computer system 108, which then can initiate the blocking of the motorvehicle 100.

FIG. 7 shows an alternate embodiment of a method according to the invention. In step 400, the vehicle is activated, for instance, by the pressing of a starter button (see step 200 of FIGS. 2 and 5). Following this, a communication connection is established in step 402 between the vehicle and the Trust-Center. By means of the data connection, in step 404, a first cryptographic authentication step is performed, for instance, by the exchange of a pseudo random number as described above.

After the successful completion of this first step of the cryptographic authentication in step 404, the Trust-Center requests, in step 406, the signed Motorvehicle ID from the motorvehicle. The motorvehicle then generates, in step 408, a signature on the Motorvehicle ID and transmits this signature in step 410 to the Trust-Center. There, the signature is verified in step 412. If the signature is valid, then the second step of the cryptographic authentication is also successfully completed.

Subsequently, it is verified, in step 414, whether a blocking has been entered into the blocking list relative to the motorvehicle. If this is not the case, a usage signal in the form of a release code is sent, in step 416, to the motorvehicle, and is received there, in step 418, so that the use of the motorvehicle is allowed.

If, however, it is revealed, in the step 414, that a blocking is noted in the blocking list of the motorvehicle, then, consequently, a blocking signal in the form of a blocking code is sent, in step 419, to the motorvehicle and received there in step 420. Subsequently, the motorvehicle determines, in step 422, its actual geographic position, for instance, by request of a GPS receiver, and transmits this actual position, in step 422, to the Trust-Center. The Trust-Center can then forward this position information in step 424, for instance, to the police.

FIG. 8 shows an embodiment of the method according to the invention for the updating of the blocking list. In step 500, the loss message reaches the blocking service with which, for instance, the user or the owner of the motorvehicle announces the theft of this motorvehicle. Subsequently, a data connection is established in step 502 between the blocking service and the Trust-Center.

In step 504, the blocking service is authenticated with the Trust-Center. After successful authentication, the Trust-Center generates, in step 506, a blocking mask into which the blocking of the certificate, which is attributed to the motorvehicle announced as stolen, can be entered by the blocking service (step 508). The request for blocking of the certificate is signed, in step 510, with the secret key of the blocking service and transmitted to the Trust-Center. The Trust-Center verifies, in step 512, the signature of the blocking service, and updates the blocking list accordingly, in step 514, if the signature is valid.

Even with high-priced motorvehicles, one of the components 120 of the motorvehicle electronics 102 can occasionally fail and must be replaced by a new one (see FIGS. 3 and 4). By exchanging one of the components 120, their identifier consequently changes, such as, e.g., the serial number, and therefore, also, the resulting code changes. In such a case, the certificate 130 must be exchanged by a new certificate as required, which contains the updated code. In order to avoid manipulations, this must be done in garages authorized for this purpose such as shown in FIG. 9.

The authorized garage has a garage computer 148, for instance, a special personal computer with different diagnostics functions for the motorvehicle electronics 102. Garage computer 148, for instance, can be directly connected via one or more cables 150 with the motorvehicle electronics 102.

The garage computer contains an asymmetric pair of keys consisting of a public key 152 and a secret key 154, as well as a corresponding certificate 156 that is attributed to the corresponding authorized garage. The authorized garage is noted in the certificate 156.

The garage computer 156, for instance, can communicate with the computer system 108 of the Trust-Center via the network 106. The computer system 108 has a certificate generator 158 for the generation of certificates.

After one or more the components 120 of the motorvehicle electronics 102 have been replaced by the corresponding replacement parts, the garage computer 148 reads the resulting code from the motorvehicle electronics 102. The garage computer 148 then establishes a connection with the computer system 108 and authenticates itself with that computer. After successful authentication, the garage computer 148 transmits a request for a new certificate with a new code to the computer system 108. Subsequently, the certificate generator 158 is started there, which generates the correspondingly updated certificate 130 that is then entered through the garage computer 148 or directly into the motorvehicle electronics 102 and overwrites the previous certificate 130.

FIG. 10 shows a corresponding flow diagram. After the motorvehicle electronics have been repaired, a data connection is established between the motorvehicle electronics and the garage computer (step 600), and, in step 602, a data connection is established between the garage computer and the Trust-Center. Subsequently, the identity of the garage computer is cryptographically identified and/or authenticated with the Trust-Center in step 604.

After successful, e.g., cryptographic authentication of the garage computer with the Trust-Center, the garage computer reads in step 606 the new code that results from the exchange of one or more components of the electronics, out of the motorvehicle electronics (step 606), and transmits on this basis in step 608 a request for a corresponding new certificate to the Trust-Center.

This request also contains the new code. Subsequently, the Trust-Center establishes the new certificate in step 610 and transmits it to the garage computer in step 612. The garage computer then installs, in step 614, the new certificate in the motorvehicle electronics by, for instance, overwriting the old certificate by the new certificate. As an example, the new certificate is written directly onto the chip card of the control device of the motorvehicle electronics by means of secure messaging (see the control device 120 and the chip card 144 in FIG. 6).

REFERENCE DESIGNATION LIST 100 motorvehicle
102 motorvehicle electronics
104 instructions
106 network
108 computer system
110 instructions
112 storage unit
114 computer system
116 instructions
118 application program
120 component
122 network
124 storage unit
126 public key
128 secret key
130 certificate
132 public key
134 secret key
136 attribution table
138 mobile radio antenna
140 server
142 chip card
144 chip card
146 pair of keys
148 garage computer
150 cable
152 public key
154 secret key 156 certificate
158 certificate generator

The invention claimed is:

1. A method for the protection of a movable item (100) against unauthorized use, wherein the movable item is an aircraft, vehicle, a motor vehicle, or a construction machine, the method comprising the following steps:
cryptographically authenticating the movable item to an external computer system (108), wherein the cryptographical authentication is performed using an asymmetric key pair (126, 128) which is associated with the movable item, wherein the asymmetric key pair comprises a secret key (128) and a public key (126), wherein a code is obtained from one or more identifiers of electronic components (120) of the movable item, wherein the code is signed using the secret key (128), wherein the code is used to identify the movable item,
sending the signed code and a certificate (130) from the movable item to the external computer system, wherein the certificate contains the public key, wherein the certificate contains a code or an identifier identifying the movable item,
receiving the signed code and the certificate (130) from the movable item by the external computer system,
checking validity of the signed code using the public key by the external computer system, wherein the signed code is valid if the signed code matches the code of the certificate or if the signed code matches a code which is associated, in an association table (136), with the identifier contained in the certificate, wherein the association table is stored in the external computer system, wherein the signed code is compared with the code in the certificate when the certificate contains the code, and wherein the signed code is compared with the code in the association table when the certificate contains the identifier identifying the movable item,
performing a check by the external computer system to determine whether a block is stored for the movable item,
sending a use signal from the external computer system to the movable item in order to allow use of the movable item when no block is stored for the movable item, wherein the use signal is sent only if the signed code is valid, and
sending a block signal from the external computer system to the movable item, wherein the block signal is sent only if a block is stored for the movable item or the signed code is invalid.

2. The method according to claim 1, wherein:
the computer system contains a database for storing blocks, and
the method further comprises accessing the database by the computer system, after completion of the cryptographic authentication of the movable item, in order to verify whether the block for the movable item is stored in the database.

3. The method according to claim 2, further comprising the steps of:
receiving a message signalizing loss of the movable item by the computer system, and
storing a block for the movable item in response to said message.

4. The method according to claim 1, further comprising the steps of:
reception of a substitute code by the computer system,
generation of a substitute certificate for the substitute code, transmission of the substitute certificate via a secure connection to the movable item in order to replace the certificate stored in the movable item.

5. The method according to claim 4, wherein the certificate is replaced by the substitute certificate upon request of an authorized garage.

6. The method according to claim 1, wherein the computer system belongs to a trust-center.

7. A non-transitory, computer readable storage medium, comprising instructions executable by a computer and which cause the computer to perform actions for the protection of a movable item (100) against unauthorized use, where the movable item is an aircraft, vehicle, a motor vehicle, or a construction machine, the actions comprising:
cryptographically authenticating the movable item to an external computer system (108), wherein the cryptographical authentication is performed using an asymmetric key pair (126, 128) which is associated with the movable item, wherein the asymmetric key pair comprises a secret key (128) and a public key (126), wherein a code is obtained from one or more identifiers of electronic components (120) of the movable item, wherein the code is signed using the secret key (128), wherein the code is used to identify the movable item,
sending the signed code and a certificate (130) from the movable item to the external computer system, wherein the certificate contains the public key, wherein the certificate contains a code or an identifier identifying the movable item,
receiving the signed code and the certificate (130) from the movable item by the external computer system,
checking validity of the signed code using the public key by the external computer system, wherein the signed code is valid if the signed code matches the code of the certificate or if the signed code matches a code which is associated, in an association table (136), with the identifier contained in the certificate, wherein the association table is stored in the external computer system, wherein the signed code is compared with the code in the certificate when the certificate contains the code, and wherein the signed code is compared with the code in the association table when the certificate contains the identifier identifying the movable item,
performing a check by the external computer system to determine whether a block is stored for the movable item,
sending a use signal from the external computer system to the movable item in order to allow use of the movable item when no block is stored for the movable item, wherein the use signal is sent only if the signed code is valid, and
sending a block signal from the external computer system to the movable item, wherein the block signal is sent only if a block is stored for the movable item or the signed code is invalid.

8. A computer system, operating under the control of a computer program and which cause the computer to perform actions for the protection of a movable item (100) against unauthorized use, where the movable item is an aircraft, vehicle, a motor vehicle, or a construction machine, the actions comprising:
cryptographically authenticating the movable item to an external computer system (108), wherein the cryptographical authentication is performed using an asymmetric key pair (126, 128) which is associated with the movable item, wherein the asymmetric key pair comprises a secret key (128) and a public key (126), wherein a code is obtained from one or more identifiers of electronic components (120) of the movable item, wherein the code is signed using the secret key (128), wherein the code is used to identify the movable item, sending the signed code and a certificate (130) from the movable item to the external computer system, wherein the certificate contains the public key, wherein the certificate contains a code or an identifier identifying the movable item, receiving the signed code and the certificate (130) from the movable item by the external computer system, checking validity of the signed code using the public key by the external computer system, wherein the signed code is valid if the signed code matches the code of the certificate or if the signed code matches a code which is associated, in an association table (136), with the identifier contained in the certificate, wherein the association table is stored in the external computer system, wherein the signed code is compared with the code in the certificate when the certificate contains the code, and wherein the signed code is compared with the code in the association table when the certificate contains the identifier identifying the movable item, performing a check by the external computer system to determine whether a block is stored for the movable item, sending a use signal from the external computer system to the movable item in order to allow use of the movable item when no block is stored for the movable item, wherein the use signal is sent only if the signed code is valid, and sending a block signal from the external computer system to the movable item, wherein the block signal is sent only if a block is stored for the movable item or the signed code is invalid.

\* \* \* \* \*